US007693751B2

(12) United States Patent
Aronson

(10) Patent No.: US 7,693,751 B2
(45) Date of Patent: Apr. 6, 2010

(54) METHOD AND COMPUTER READABLE MEDIUM FOR INTEGRATING A DIAMOND CONSUMER, DIAMOND RETAILER, AND DIAMOND WHOLESALER, INCLUDING CONSUMER TRACKING

(75) Inventor: Avrille Friedman Aronson, Aventura, FL (US)

(73) Assignee: Payless Certified Diamonds.com, Inc., Hollywood, FL (US)

( * ) Notice: Subject to any disclaimer, the term of this patent is extended or adjusted under 35 U.S.C. 154(b) by 1329 days.

(21) Appl. No.: 11/130,791

(22) Filed: May 17, 2005

(65) Prior Publication Data

US 2006/0265288 A1    Nov. 23, 2006

(51) Int. Cl.
*G06Q 30/00* (2006.01)
*G06F 17/30* (2006.01)

(52) U.S. Cl. .............................. 705/26; 705/27; 705/1; D11/16; D11/34; D11/89

(58) Field of Classification Search ..................... 705/1, 705/26–27; D11/16, 34, 89
See application file for complete search history.

(56) References Cited

U.S. PATENT DOCUMENTS

| | | | | |
|---|---|---|---|---|
| 7,386,485 | B1* | 6/2008 | Mussman et al. | 705/26 |
| 7,437,313 | B1* | 10/2008 | Mussman | 705/26 |
| 2002/0010657 | A1* | 1/2002 | Voorhees | 705/27 |
| 2002/0099622 | A1* | 7/2002 | Langhammer | 705/26 |
| 2002/0116275 | A1* | 8/2002 | Woolston | 705/26 |
| 2002/0184104 | A1* | 12/2002 | Littman | 705/26 |
| 2003/0065586 | A1* | 4/2003 | Shaftel et al. | 705/27 |
| 2003/0115079 | A1* | 6/2003 | Rapaport | 705/1 |
| 2005/0246239 | A1* | 11/2005 | Yeko | 705/26 |
| 2005/0261989 | A1* | 11/2005 | Vadon et al. | 705/27 |
| 2006/0020524 | A1* | 1/2006 | Yeko et al. | 705/27 |
| 2006/0224422 | A1* | 10/2006 | Cohen | 705/4 |
| 2007/0219960 | A1* | 9/2007 | Vadon et al. | 707/3 |

OTHER PUBLICATIONS www.findmyrock.com. Feb. 5, 2005. Recovered from www.archive.org on Sep. 15, 2009.*
www.loose-gems.com. Jan. 2, 2005. Recovered from www.archive.org on Sep. 15, 2009.*
Documents evidencing an offer to sell at the JCK Trade Show in Las Vegas, NV, Jun. 1, 2000.
VirtCert.com's Guided Tour; at http://virtcert.com/tour begin.html, Apr. 4, 2003.
VirtCert.com's Networked Inventory Engine at http://virtcert.com/nie.html, Apr. 4, 2003.

(Continued)

*Primary Examiner*—Jeffrey A. Smith
*Assistant Examiner*—William J. Allen
(74) *Attorney, Agent, or Firm*—Robert C. Kain, Jr.

(57) ABSTRACT

The method for electronically vertically integrating a consumer, retailer and wholesaler of diamonds (or jewelry) includes maintaining a diamond inventory database which lists common characteristics, wholesale price and retail price. In the retail facility or space, the consumer electronically searches the diamond database and is presented with record displays of diamonds within the scope of the search and the retail price. A retailer's computer can mimic the consumer search and display the wholesale price. This tracking and a sales alarm trigger facilitates a face-to-face sale of the diamond. An alarm issues when the consumer's search exceeds certain predetermined parameters. A computer readable medium and an information processing system are included.

100 Claims, 16 Drawing Sheets

OTHER PUBLICATIONS

VirtCert.com at http://www.professionaljeweler.com/archives/features/site/2001/090501 site.html Sep. 5, 2001.

DiamondSea.com—How it Works at http://diamondsea.com/howitworks.html Jun. 22, 2003.

DiamondSea.com—Services at http://diamondsea.com/services.html Feb. 16, 2004.

DiamondSea.com at http://wvvw.alexa.com/data/details/main/diamondsea.com Oct. 10, 2002.

Tradeshop.com at http://web.archive.org/web/20010404055602/http://www.tradeshop.com/ Apr. 4, 2001.

USADiamondFind.com at http://usadiamondfind.com (now offline) Sep. 30, 2001.

* cited by examiner

FIG. 7A

Click column headings to sort. Click on the lot number to see diamond details.

☑ select all     print selected stones    🔍 perform new search    ✳ search entire database

| Select | Supplier | Lot # | Cost | Cost/Ct | % off Rap | Retail | Retail/Ct. | Shape | Size | Color | Clarity | Cert. |
|--------|----------|-------|------|---------|-----------|--------|------------|-------|------|-------|---------|-------|
| ☐ | M. Geller | Q9231 | $3,029.40 | $2,970.00 | 30 | $3,938.22 | $3,861.00 | asscher | 1.02 | I | VS2 | EGL |
| ☐ | M. Geller | Q9566 | $16,330.38 | $7,194.00 | 30 | $21,229.49 | $9,352.20 | asscher | 1.02 | G | VS1 | EGL |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |
| ☐ | | | | | | | | | | | | |

Diamond Detail

Lot #: Q5770

| Cost | Retail | % Profit | Shape | Size | Color | Clarity |
|---|---|---|---|---|---|---|
| $2,425.36 | 3,152.97 | 30 | round | 0.56 | D | VS1 |

| Polish | Sym. | Depth % | Table % | Fluor. | Culet | Girdle |
|---|---|---|---|---|---|---|
| VG | GD | 58.5 | 64.0 | None | None | THIN-MED |

Measurements: 5.35x5.5.41x3.15mm

Table %: 64.0

View Certificate
click to view report

Supplier Info: M. Geller   IL

<<Back to List

Suppliers

To sort items, click column headings

| Name | Type | City | State | Phone | Email | |
|---|---|---|---|---|---|---|
| Joseph Blank & Sons | Dealer | New York | NY | | | Add to Favori |
| M. Geller | Dealer | Chicago | IL | | | Add to Favori |
| Quality | Dealer | San Diego | CA | | | Add to Favori |
| Reuven Kauffman | Dealer | New York | NY | | | Add to Favori |
| Stuller | Dealer | Lafayette | LA | | | Add to Favori |

 Favorite Suppliers

To sort items, click column headings

| Name | Type | City | State | Phone | Email | |
|---|---|---|---|---|---|---|
| Joseph Blank & Sons | Dealer | New York | NY | | | Add to Favori |
| M. Geller | Dealer | Chicago | IL | | | Add to Favori |
| Stuller | Dealer | Lafayette | LA | | | Add to Favori |

FIG. 7D

☑ select all  🖨 print selected stones  🔍 perform new search

See Salesperson ⟶ Now

| Select | Lot # | Price | Shape | Size | Color | Clarity | Cert. | Depth | Table |
|--------|-------|-------|-------|------|-------|---------|-------|-------|-------|
| ☐ | Q9231 | $3,928.22 | asscher | 1.02 | I | VS2 | EGL | 72.5 | 74 |
| ☐ | Q9566 | $21,229.49 | asscher | 1.02 | G | VS1 | EGL | 60.5 | 76 |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |

🔍 Diamond Guide

Shape
▫ ◉ ▢ ◊ ◆ ◉ ▢ ◉ ▫ ◁    Asscher cut
                          Round/Brilliant cut

FIG. 9B

Diamond Detail

| Lot # | Retail | Shape | Size | Color | Clarity |
|---|---|---|---|---|---|
| Q5770 | 3,152.97 | round | 0.56 | D | VVS1 |

| Polish | Sym. | Depth | Table | Fluor. | Culet | Girdle |
|---|---|---|---|---|---|---|
| VG | GD | 58.5 | 64.0 | None | None | THIN-MED |

Measurements: 5.35x5.5.41x3.15mm

Cert.: GIA

Viewable Certificate
click to view report

<<Back to List

See Salesperson "Now"

Diamond Guide
- Princess cut
- Pear cut
- Radiant cut
- Triangle cut

Size
Size refers to

*FIG. 9C*

METHOD AND COMPUTER READABLE MEDIUM FOR INTEGRATING A DIAMOND CONSUMER, DIAMOND RETAILER, AND DIAMOND WHOLESALER, INCLUDING CONSUMER TRACKING

The present invention relates to a system and a method for electronically vertically integrating a diamond retailer, wholesaler and a consumer with a finder, tracker and sale system which can also be expanded into the jewelry merchandising field.

BACKGROUND OF THE INVENTION

With the advent of the Internet, retailers and wholesalers of cut and polished diamonds have produced websites which enable the consumer to directly purchase finished diamonds (as well as other jewelry which typically includes diamonds). However, in conjunction with the purchase of diamonds, many times the consumer should be educated regarding the characteristics of the diamond, that is, the weight in carats, color, clarity and cut. The price of the diamonds at the retail level generally mystifies the typical consumer. After educating a consumer regarding the common characteristics of diamonds, oftentimes a retailer can sell one or more diamonds to such consumer in a face to face transaction. However with on line sales efforts via the Internet, this personal face-to-face educational process and resulting commercial transaction (the sale of the diamond to the consumer) has been disrupted. Therefore, the Internet has reduced the profit margins of the retailer and the wholesaler, has increased the probability that the product purchased by the consumer may be inferior and has increased the possibility that the diamonds purchased on the Internet at retail are over-priced.

OBJECTS OF THE INVENTION

It is an object of the present invention to provide a method for electronically vertically integrating a consumer interested in buying a diamond, a retailer of the diamond and a wholesaler selling a plurality of diamonds.

It is another object of the present invention to provide an electronic sales method and methodology to facilitate the face-to-face sale of diamonds between a consumer and a retailer.

It is a further object of the present invention to provide an information processing system to facilitate the face-to-face sale of diamonds and jewelry.

It is a further object of the present invention to provide a method for increasing the sales of jewelry with a finder, tracker and sales system.

It is a further object of the present invention to utilize both a consumer computer and a retailer computer in a retail facility which permits the consumer to search through an inventory of diamonds available from that retailer and its wholesalers and further which permits the retailer to close the diamond sale with the assistance of a retailer computer showing the wholesale cost of the diamond. Although the wholesale cost of the diamond is not shown to the consumer, the retail cost is revealed as is all other characteristics of the stones or jewelry.

It is an additional object of the present invention to provide a method and a system wherein the system automatically pre-prices the diamond inventory available to the retailer based upon selectable retail markup percentages.

It is another object of the present invention to provide a method and a system which monitors the consumer's search through the diamond inventory database and which prompts the retailer to engage in a face-to-face negotiation with the consumer after the consumer's search exceeds certain predetermined parameters.

SUMMARY OF THE INVENTION

The method for electronically vertically integrating the consumer, the retailer and the wholesaler of diamonds (or jewelry) includes maintaining an inventory database compilation of the diamonds or jewelry wherein the database is organized to list common characteristics of the item to be sold and also the wholesale price and the retail price of the item. In the retail facility or other space under the control of the retailer, the consumer is permitted to electronically search the inventory database (both wholesale and retail inventory) by searching common characteristics and the consumer computer displays those characteristics for any diamond or piece of jewelry found within the scope of the search as well as the retail price. The wholesale price is not shown to the consumer. The retailer's computer displays for any diamond found by the consumer, the common characteristics of the stone, the retail price and the wholesale price. This facilitates a face-to-face sale of the diamond or jewelry with the consumer and the retailer. The database may include certification certificates for the diamond. Tracking may be implemented such that the retailer is sent an alarm when the consumer's search exceeds certain predetermined parameters (time, frequency, price range parameters) thereby initiating the face-to-face sale of goods. A computer readable medium with programming instructions is included and an information processing system is implemented including a diamond inventory database, a search engine, and first and second displays for the consumer and the retailer.

BRIEF DESCRIPTION OF THE DRAWINGS

Further objects and advantages of the present invention can be found in the detailed description of the preferred embodiments when taken in conjunction with the accompanying drawings in which:

FIGS. 7A, 7B, 7C and 7D illustrate data input and output screens for the electronic method, information processing system and computer program for the retailer module;

FIGS. 9A, 9B and 9C diagrammatically illustrate data input and output screens for the consumer computer or consumer module;

DETAILED DESCRIPTION OF THE PREFERRED EMBODIMENTS

Figure 1:
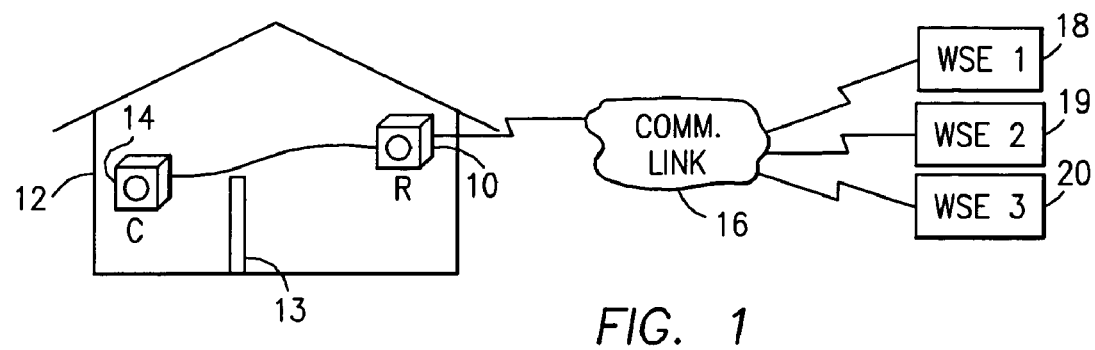
FIG. 1 diagrammatically illustrates a simple electronic method and system with a single consumer computer and a single retailer computer electronically connected via a communications link to a plurality of wholesalers selling diamonds or jewelry.

The present invention relates to a method for electronically vertically integrating a consumer interested in buying a diamond or a piece of jewelry, a retailer of the diamond or jewelry and one or more wholesalers selling a plurality of diamonds or a plurality of pieces of jewelry and also relates to an electronic sales method to facilitate the face-to-face sales of diamonds and jewelry, relates to a computer readable medium incorporating instructions for these electronic systems and relates to an information processing system.

The present invention is operable on a personal computer (PC) system with at least two computers, on a computer network (LAN or WAN) and over the Internet and also relates to computer programs, computer modules and information processing systems which accomplish and implement this electronic sales system. In addition to the computer implementation of the inventive aspects of this invention, several business methods are also encompassed herein.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views. Functional aspect may be configured as hardware such as the search routine in the consumer module or program can be configured as a search engine.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with several general purpose computers, as would be known to one of ordinary skill in the art, arranged to perform the functions described and the method steps described. The operations of such a computer system, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The term data base means all types of data structures whether in flat form, such as a spread sheet, or other forms (such as a matrix of data), such that groups of data, associated with a single item, such as a diamond, are organized into fields or sub-groups such that the group or record for a single diamond can be easily compared or sorted or processed by association to similar sub groups for other diamond records.

In the drawings, and sometimes in the specification, reference is made to certain abbreviations. The following Abbreviations Table provides a correspondence between the abbreviations and the item or feature.

| | Abbreviations Table |
|---|---|
| Admin | administration |
| Alm | alarm, audio or visual or combo, such as trig alm |
| ASP | application service provider - server on a network |
| bd | board |
| C | consumer |
| C-trig | consumer trigger to motivate salesperson to interact with consumer |
| cert | certificate generally recognized as describing the characteristics of a certain diamond |
| comm. | communications, typically telecommunications |
| comp | computer |
| cnt | count such as trigger count down ("trig cnt") |
| CPU | central processing unit |
| DB | data base |
| D detail | detail records of particular diamond |
| D sch | diamond search |
| disp | display |
| doc | document |
| educ | any displayed information to educate consumer about product |
| faves | favorites |
| I/O | input/output |
| id | identify |
| invt | inventory |
| mem | memory |
| ntwk | network as in "comm ntwk" - communications network |
| pgm | program |
| PO | printed out document |
| R | retailer of diamonds and/or jewelry |

-continued

Abbreviations Table

| | |
|---|---|
| R-C trig | retailer audio/visual trigger to personally interact with consumer |
| req | request |
| rpt | report |
| sch | search ("D sch" is diamond search) |
| sim displ | simultaneous display |
| St | store |
| sys | system |
| t | time |
| term | terminal or computer or computer workstation |
| trig | trigger to cause someone to act (trig cnt for R-C trig) |
| tele-com | telecommunications system or network |
| URL | Uniform Resource Locator, x pointer, or other network locator |
| Wse | Wholesaler of diamonds and/or jewelry |

FIG. 1 diagrammatically illustrates a simplified version of the electronic sales methodology, information processing system and vertical integration system in accordance with the principles of the present invention. Retailer R utilizes a retailer computer 10 (which may be a work station tied to a server or other type of computer, known to persons of ordinary skill in the art) in a retail facility 12. Retailer computer 10 is electrically coupled to facilitate electrical electronic communication (which may be hard wired or infrared or other radio frequency RF communications link) to a consumer C computer 14. Consumer computer 14 is physically separated from retailer computer 10 because certain information is displayed to the consumer at consumer computer 14 which is different than the information displayed to the retailer R at retailer computer 10. The retailer sees wholesale prices and markups and profit margins and the consumer does not see those items. Graphic bar 13 graphically illustrates the physical separation of consumer C and retailer R. Bar 13 may be a countertop. Retailer computer 10 is electronically coupled to communications link 16 and ultimately to wholesaler computers 18, 19, 20 which are owned or controlled by wholesalers 1, 2 and 3 respectively.

Figure 2:
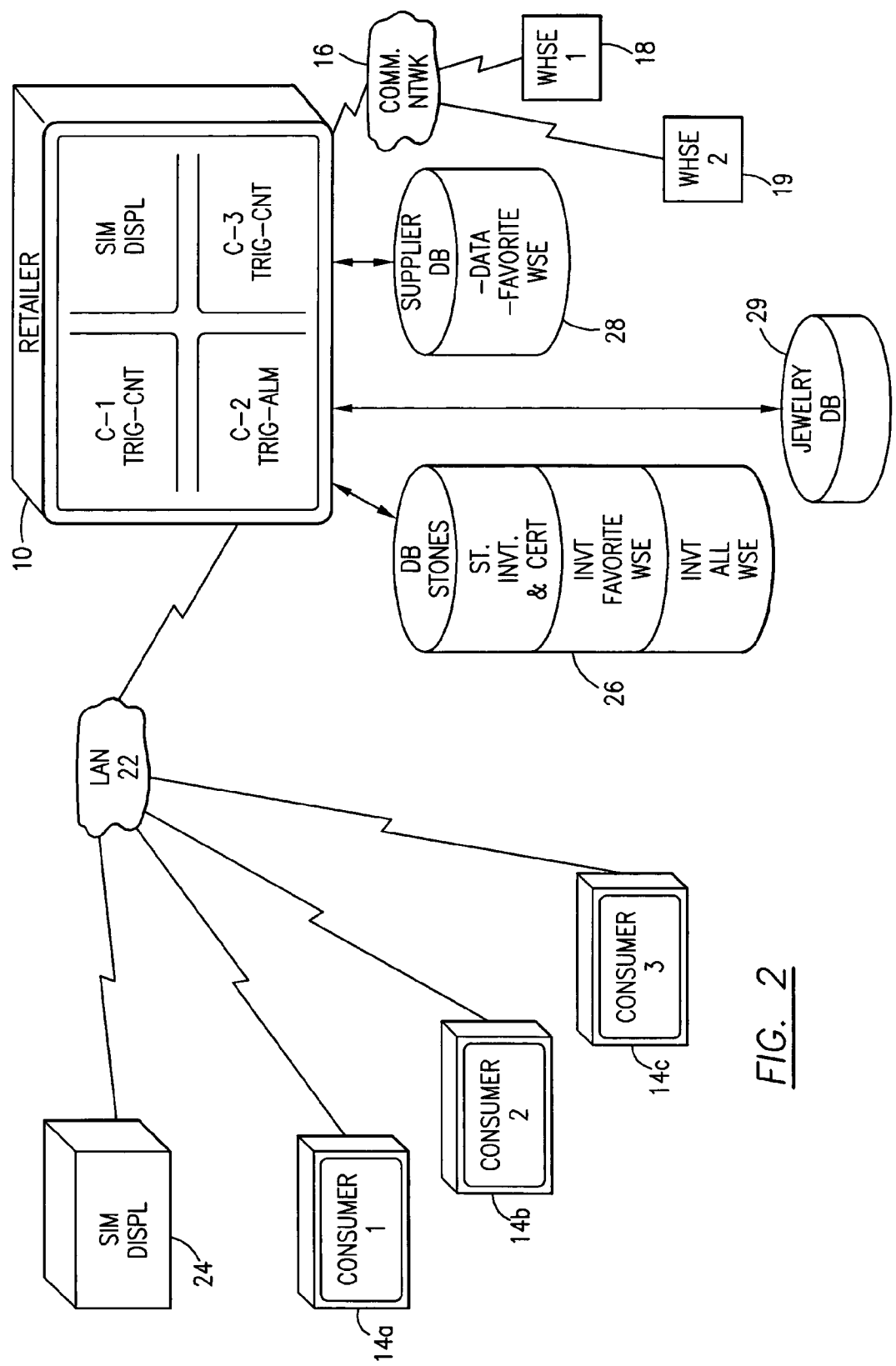
FIG. 2 diagrammatically illustrates the electronically vertically integrated system at the retail facility or other space under the control of the retailer and also shows the communications network tied to the remote locations for the wholesalers.

FIG. 2 diagrammatically shows a more expanded version of the electronic system wherein retailer computer 10 is coupled via local area network or LAN 22 to a plurality of consumer computers 14a, 14b and 14c, sometimes referred to herein as consumer computers C 1, 2 and 3. In addition, LAN 22 (which may be a hard wire or an RF system) is coupled to simultaneous display 24. Display 24 is configured to visually present ads.

Retailer computer 10 has a split screen display showing, in one embodiment, the simultaneous display on consumer computers 1, 2 and 3 in areas C-1, C-2 and C-3 as well as the display on display unit 24 in the area marked "SIM DISPL." In addition to showing the content of display on consumer computers 1, 2 and 3, retailer computer 10 shows a trigger count for consumer computers C-1 and C-3 and shows a trigger alarm ON for computer C-2. The triggers are explained later.

Retailer computer 10 is electronically coupled or associated with databases 26, 28 and 29 as well as communications network or link 16 establishing a communications link with retailer computer 10 to enhance or populate databases 26, 28 and 29 from wholesalers 1 and 2 and computers 18, 19. In summary, consumer computers 1, 2, 3 are separated physically away from retailer computer 10. In some instances, consumer computers 1, 2 will be placed on a counter in a retail facility under the control or ownership or lease of the retailer. Otherwise, a consumer computer may be in a kiosk under the control of a retailer. These consumer computers 1, 2 are accessible by the consumers such that the consumers can conduct a search through the databases looking for diamonds and jewelry and particularly through stones (diamond) database 26 (diamond inventory database) and jewelry database 29. Each consumer computer has a software search engine. A record of each stone, diamond or piece of jewelry includes fields with common characteristics of the stone or piece. Examples of the fields in the diamond database are listed later and are shown in the drawings. Preferably, consumer computers 1, 2 are touch screen configured computers such that the consumer simply touches the screen and inputs his or her search parameters. Search parameters match the common characteristics. The use of a keyboard and mouse, trackball or touch pad is also contemplated herein. In one embodiment, the retailer 10 can at any moment select one or more of the consumer computers and display, monitor and track the content of the consumer computers on the display screen of retailer computer 10. Therefore, the retailer can determine what each consumer 1, 2 is looking at and, at the appropriate time, send over a salesperson to interact face-to-face with the consumer at consumer computers 1, 2. With respect to consumer computer 3, that computer may be in a kiosk in a mall wherein the kiosk is under the control of the retailer. Although remote from the store, the kiosk is under the control of the retailer due to the presence of the consumer computer. By using a kiosk in a mall and permitting the consumer to conduct a database search looking for stones, diamonds and jewelry, the retailer hopes to draw that consumer at the kiosk into the retail jewelry store in order to personally sell the diamond or piece of jewelry to the consumer. The consumer is shown the diamond record and the retail price of the merchandise but is not shown the wholesale price. The substantially simultaneous "consumer computer" display enables the retailer to quickly identify a potentially high value sale for a potential consumer of diamonds and/or jewelry. The retailer sees price points and profit margins in the diamond record. The trigger counts in retailer display segments C-1 and C-3 show the progress of each consumer search and how long a particular consumer has been on a consumer computer (a time based trigger alarm). When the time exceeds a certain level (a timed alarm) or the type of search exceeds certain preset or programmable parameters (frequency of search, number of hits, dollar value of stones etc.), an alarm is issued and the retailer at retailer computer 10 sends over a salesperson in order to close the deal and personally interact with the consumer at the consumer computer. With respect to consumer computer C-2 display at retailer computer 10, an alarm has been triggered (audio, visual, combination or electronic) in order to alert the retailer that a salesperson should interact with the consumer at consumer computer 2. The system has a monitor which tracks the consumer searches and issues an alarm when preset parameters are exceeded. These and other features of the electronic sales system are discussed later.

Figure 3:
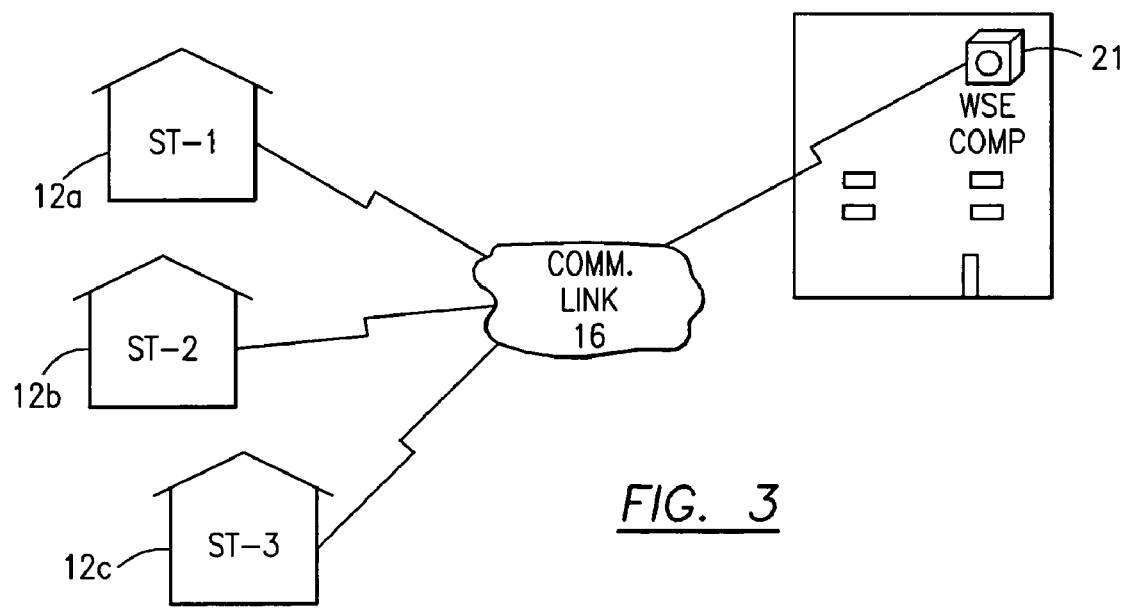
FIG. 3 diagrammatically illustrates a plurality of retail stores (St) electronically connected via a communications link or network to a wholesaler computer at a remote location.

FIG. 3 shows retail store facilities 12a, 12b and 12c as stores St-1, St-2 and St-3. These stores or retail facilities are electronically connected via communications link 16 to a wholesaler computer 21. Wholesaler computer 21 is typically at a remote location. In this situation, the databases are primarily located at the wholesaler computer 21 and the communications channel links a retailer computer 10 at each store St-1, St-2 and St-3 with computer 21. Minor databases may be maintained at stores St-1, St-2 and St-3. In this manner, the wholesaler can initiate "special sales" through its entire retail chain St-1, St-2, St-3 and activate time based display ads shown on simultaneous display 24 at each store and monitor each particular retail establishment. Also, the wholesaler computer 21 is configured to view the consumer activity on consumer computers 1, 2, 3 at each store, and judges the performance and effectiveness of the ad on simultaneous display 24 at each store, and changes the markup or markdown of the products from the wholesale price to the retail price in order to stimulate sales of merchandise through the system.

Figure 4:
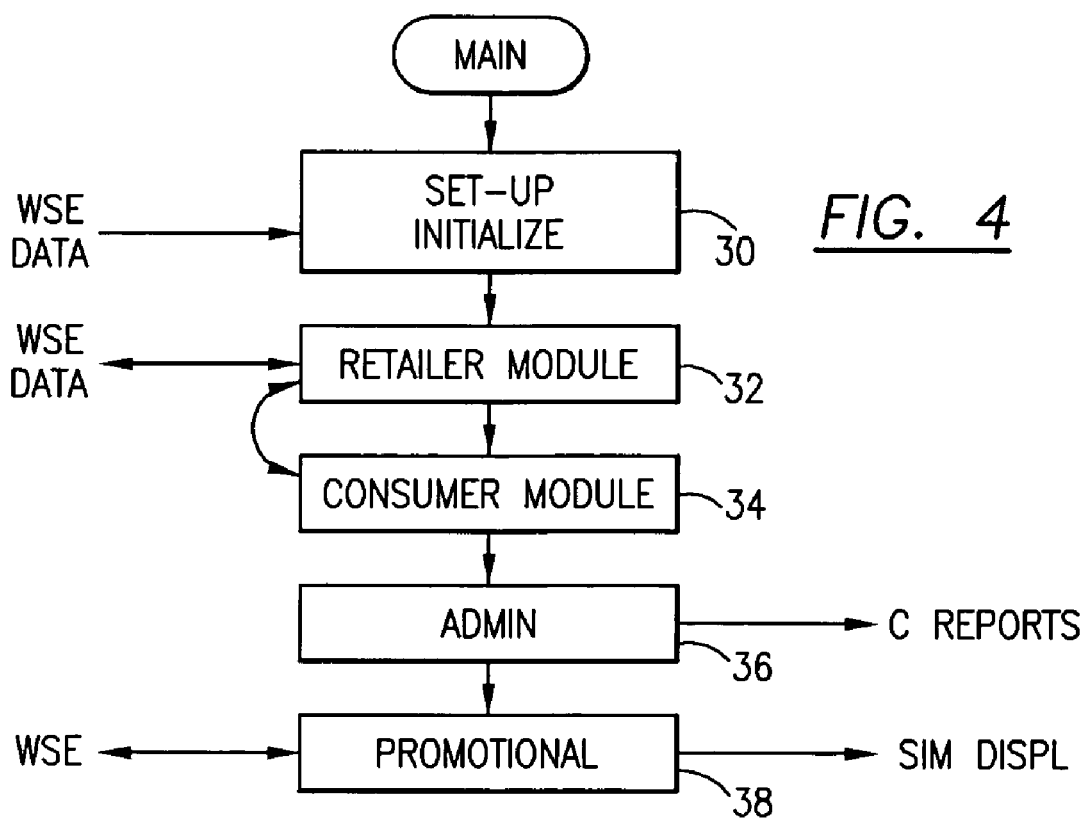
FIG. 4 diagrammatically illustrates a general flowchart for the electronic system implementing the computer program and information processing system.

FIG. 4 diagrammatically illustrates the major components of the electronic system or computer program. Setup or initialization routine 30 accepts wholesaler information regarding the plurality of stores in order to build the stone database 26 (FIG. 2). Manual, automatic or configurable input and import facilities may be used to populate the database. This retailer module 32 accepts, on a periodic basis (typically daily) information to update the stone data base 26 as well as the supplier contact data base 20 and jewelry data base 29. Retailer module 32 in a supplemental routine communicates with the wholesalers 18, 19 (FIG. 2) in order to request additional stones or ship or buy stones or jewelry. Consumer module 34 interacts with retailer module 32 and displays the diamonds or stones and the jewelry on consumer computers 1, 2, 3. Administration module 36 outputs consumer C reports to the retailer (and wholesaler, if necessary). Promotional module 38 accepts information such as electronic advertisements and data from the wholesalers (or diamond manufacturers) as well as uploads consumer search and tracking information from the consumer sales to the wholesalers, if necessary. Promotional module 38 outputs ads on simultaneous display 24.

Figure 5:
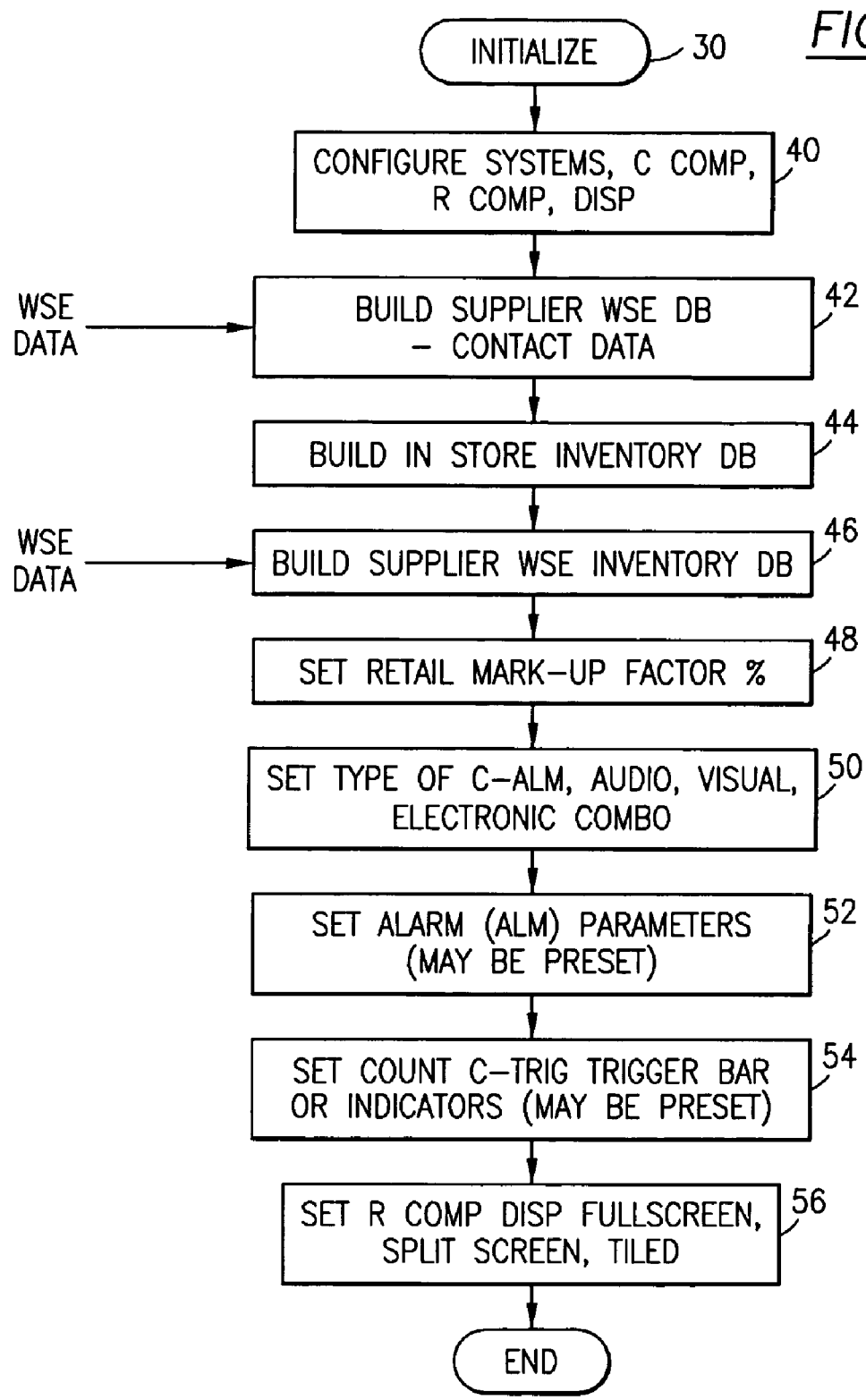
FIG. 5 diagrammatically illustrates the flowchart for the initialization module.

FIG. 5 diagrammatically shows major components of initialization routine 30. It should be noted that any of the steps in the system described in FIGS. 5-12 can be consolidated, expanded or reorganized to be more efficient as necessary. In step 40, the system (see FIG. 1 or 2) is configured. The consumer computer C, and retailer computer R and displays C-1, C-2 etc. are configured. Step 42 builds the supplier or wholesaler database 28 and contact data for each supplier or wholesaler is provided. This may include obtaining wholesaler data via communications network 16. Otherwise, the wholesaler data can be input via keypunch, floppy disc or other acceptable data input (excel spreadsheet, ASP provided input formats, etc.) means. Step 44 builds the in-store inventory database which is the portion of diamond or stone database 26. In other words, the retailer typically has an in-store inventory of diamonds and jewelry and this diamond database is input into database 26. The in-store database includes gem certification certificates usually for each diamond. Step 46 builds the supplier/wholesaler inventory database as part of the diamond database 26. Data may be electronically obtained from the wholesaler 18, 19 or may be input by hand. Electronic communications with the wholesaler provide higher accuracy to build the diamond or stone database 26. The diamond database includes common characteristics of the diamonds. The following Color Table, Certification Table, Shape and Clarity Table provide some well established common characteristics of diamonds.

Color Table (Icy White), D, E, F, G, H, I, J, (yellowish)

Certification (CERT) Table

GIA
EGL
AGS
IGI
HRD

Shape (cut) Table

AGS Ideal Cut
Crown and Pavilion
Holloway Ideal Cut
Marquise
Emerald
Heart
Pear
Princess
Oval
Round Clarity Table I1
I2
I3
SI1
SI2
SI3
VS1
VS2
VVS1
VVS2 (high quality)

Also, the diamond database 26 includes the weight in carats of each stone or diamond. The diamond database also includes other common information or common characteristics of the diamond such as the quality of the polish, and assessment of the symmetry of the cut, the size of the girdle and the size of the culet and the fluorescence of the stone. In addition, the diamond database includes lot number associating the particular stone with the information in the database, the wholesale cost, the wholesale cost per carat, the percentage discount off the Rapaport published price, the retail store markup, the retail price of the stone, diamond or jewelry, the retail price per carat and the other common characteristics of the stone, gem or jewelry.

Step 48 enables the retailer to set the retail markup factor for each stone. Since most of the information in diamond database 26 is downloaded from various wholesalers 18, 19, the retailers of diamonds typically have standard markups for each type of stone. The system may automatically markup the stone if the wholesaler electronically populates the database. The following Retail Mark-up Table provides some indication of these markups.

| Retail Mark-up Factor Table | | |
|---|---|---|
| % | Min. Wgt. | Max. Wgt. |
| 50% | 0.00 | 0.75 |
| 23% | 0.76 | 1.50 |
| 34% | 1.51 | 3.00 |
| 10% | 3.01 | 99.00 |

Step 50 permits the retailer to set the type of consumer or C-alarm, such as an audio alarm, a visual alarm, an electronic alarm or as a combination of the foregoing. These alarms are triggered when a particular consumer search on consumer computer 14a, 14b or 14c exceeds certain search parameters (discussed later). Step 52 enables the retailer to set the alarm parameters. These alarm parameters may be preset in order to facilitate installation of the computer program. Step 54 sets the count for the trigger alarm and sets the bar or visual indication showing when the trigger for the alarm will be activated. If search time is the alarm trigger, the trigger count is a bar showing x-t where x is the maximum consumer search time (pre-set alarm parameter) and t is the time at C computer. Step 56 permits the retailer to setup the retailer computer 10 screen either for a full screen, a split screen, or tile version. In other words, retailer computer R 10 can operate as a standard computer accessing all the information in diamond database 26 or wholesaler database 28 or jewelry database 29. The retailer computer R 10 operates a standard inventory program and accounting program for the retailer. For example, retailer 10 may want to call a particular wholesaler or send a wholesaler an email message. Wholesale supplier database 28 not only has all the data for all the wholesalers supplying product to retailers, but also has a list of "favorites" showing wholesalers which are contacted often by retailer R.

Figure 6:
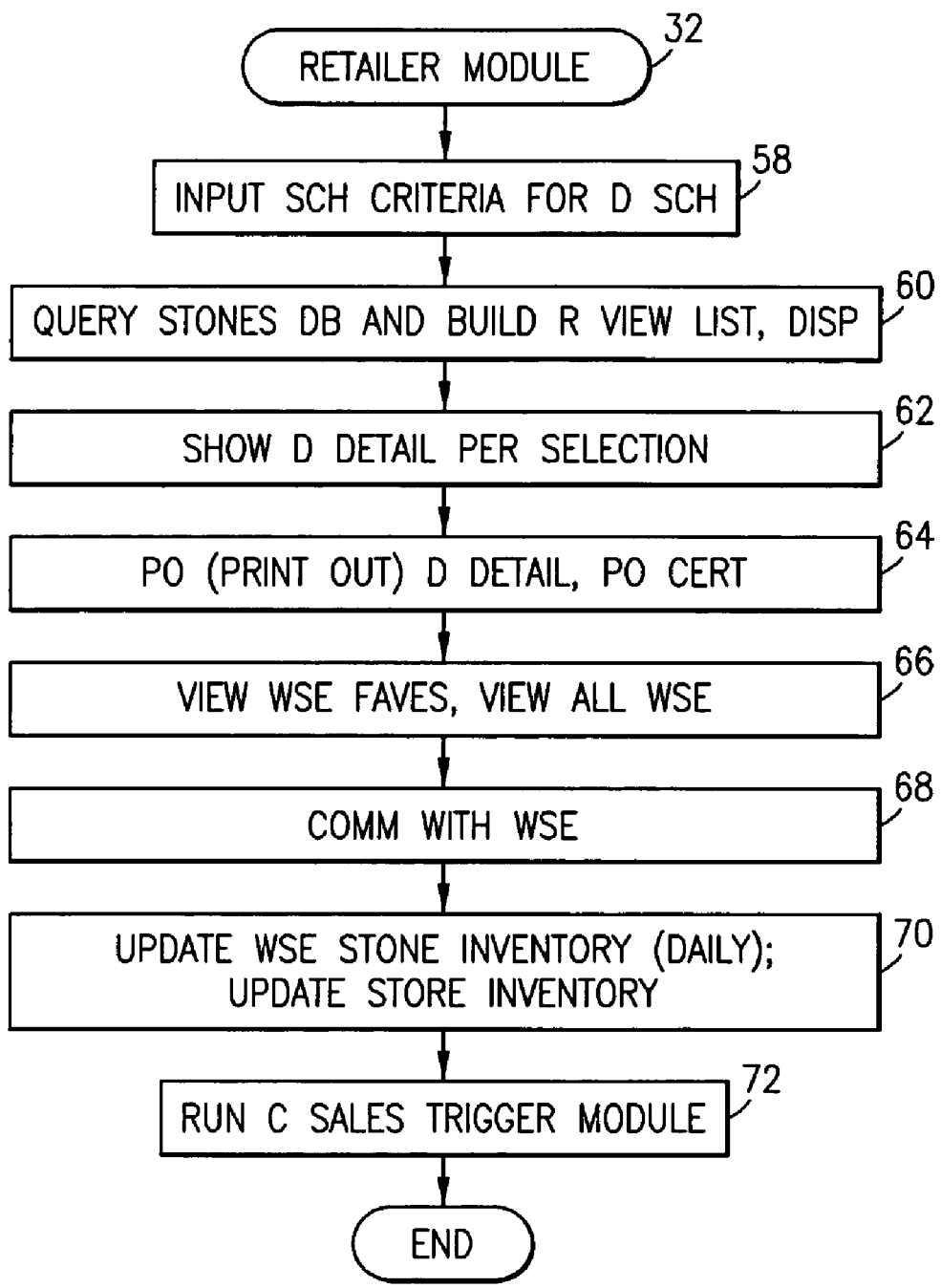
FIG. 6 diagrammatically illustrates the retailer module or sub-routine.

FIG. 6 diagrammatically shows retailer module 32. Step 58 permits the retailer to input search criteria for a diamond or D search. This flowchart is discussed concurrent with data input/output screens in FIG. 7A-7D.

Figure 7A:
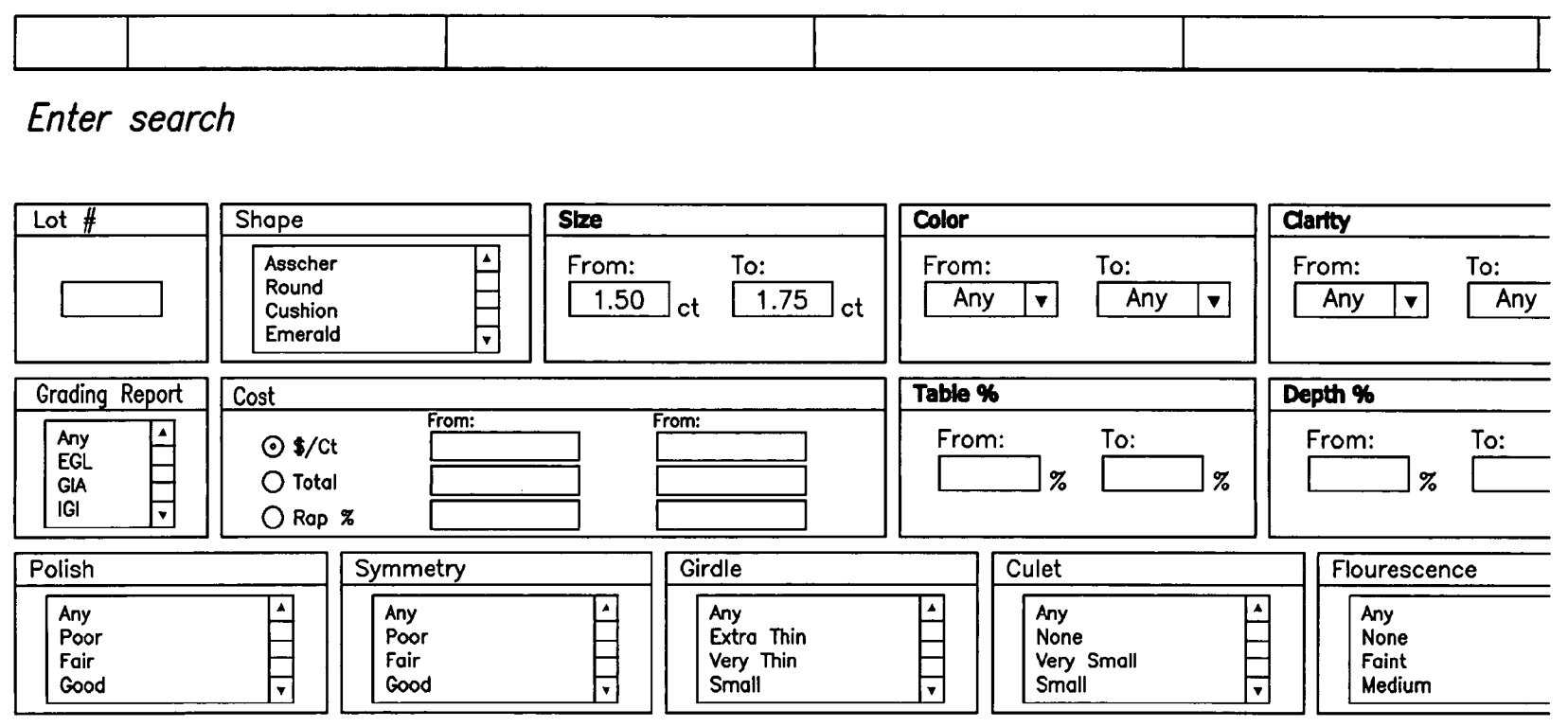
Figure 7B:
Figure 7C:

FIG. 7A shows a data input screen which enables the retailer to select one or more of the items. The lot number accesses a particular stone or lot in the diamond database 26. The retailer, by selecting the shape, size, color, clarity, grading report or cost, may generate a plurality of diamonds which fit that search criteria. If the retailer wants to search diamonds within a certain range of dollars per carat cost, he or she inputs information in the appropriate minimum or maximum fields in the input screen in FIG. 7A. The program includes a search engine operable with the databases. Polish, symmetry, girdle, culet and fluorescence as well as the percentage of the table (a common characteristic of a diamond) and depth percentage are also provided as part of the search parameters. Step 60 in FIG. 6 queries the stone or diamond database 26 and builds a retailer or R viewing list and displays that list. FIG. 7B shows a typical list for the retailer display. This list FIG. 7B shows the wholesaler or supplier, the lot number, the wholesale cost, the wholesale cost per carat, the percentage discounted off the Rapaport Diamond Report price, the retail price, the retail price per carat, the shape, size, clarity, color and type of certification. The certification grades the stones. The retailer can select one or more of these records showing a particular stone and FIG. 7C shows a detail of the report diamond D available to the retailer. This output report includes a thumbnail view of the certifying certificate and identifies the certifying authority available for the stone. This view also identifies the wholesaler or supplier. It is well known that the business transaction between a wholesaler and a retailer of diamonds involves a high degree of trust in that the wholesaler will ship the retailer requested diamonds and expect to be paid in 30-60 days.

Step 62 shows a diamond D detail as discussed above in connection with FIG. 7C. Step 64 enables the retailer to print out the diamond detail report and also print out the certificate. Certificates are scanned and placed into the diamond database 26 as PDF or TIFF files. Step 66 permits the retailer to view all favorite wholesale suppliers or to view all suppliers. FIG. 7D shows a typical output screen showing all suppliers and showing favorite suppliers for the retailer. Step 68 permits the retailer to communicate with a particular wholesaler 18, 19 to update the database as shown in step 70 or to buy goods or to return goods. Step 70 updates the diamond database 26 on a periodic basis. Typically, this would be daily or more frequently. Further, step 70 permits the retailer to update the store inventory. If the current computer program is electronically linked with a common inventory program as part of the retailer's normal inventory control, this may be provided electronically. Also, the system can automatically query the wholesale databases at wholesalers 18, 19 such that electronic communication can occur to automatically update diamond database 26 located at the retail facility. Step 72 runs the consumer or C sales trigger module discussed later.

Figure 8:
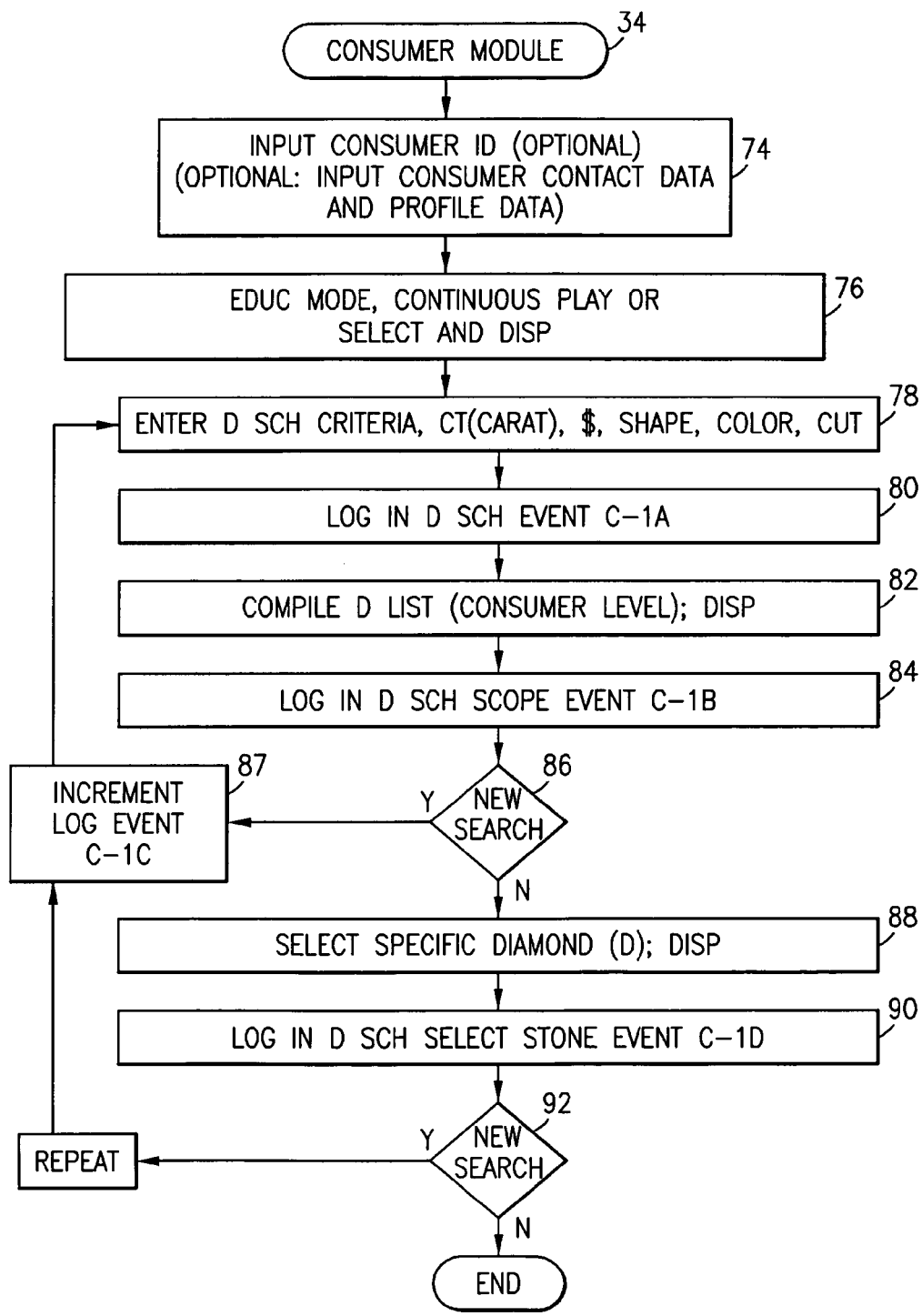
FIG. 8 diagrammatically illustrates the consumer module or program.

FIG. 8 diagrammatically illustrates consumer module 34. Step 74 optionally requests that the consumer inputs some type of ID or identification into the terminal or computer that the consumer is currently acting at. For example, consumer computer 1 (FIG. 2) interacts with a single consumer, whereas consumer computer 2 interacts with a different consumer. It is helpful to have the consumer enter some type of information, at least his or her first name, such that this consumer's inquiries can be tracked by retailer computer 10. On a more sophisticated level, the consumer computers 1, 2, 3 require the consumer to complete a contact input screen such that the consumer is required to input his or her full name, address and phone number and email address in order to build a contact database for prospective purchasers. Step 76 is an educational mode which may or may not be run at this particular time in the sequence. In other words, the educational mode can be continuously played on computer C in order to educate the consumer at consumer computer 1, 2, 3 or this mode can be selected by the consumer and thereafter displayed. The education mode includes information regarding how to identify a diamond, the common characteristics of the diamond, and how the program operates. Also, the educational program enlightens the consumer about the retain price of the diamonds and how that retail price is calculated by both the retailer and the wholesaler, as well as data describing the manufacture of the cut and polished diamond.

Figure 9A:

Step 78 enables the consumer at consumer computer C 1 to enter a diamond D search criteria which includes, at the consumer's sole request, the weight or carat, the amount of money the consumer wishes to spend for the stone, the shape, color, cut or other information. FIG. 9A shows a common or one type of input screen for this consumer diamond search. Step 1 selects the shape, step 2 selects the size, and step 3 selects any of the prices. Of course, each of these fields could be drop down fields such as the price may list increments of $1,000, less than $1,000; $1,001-2,000; $2,001-3,000; $3,001-5,000; over $5,000. One benefit of the electronic sales method and system is that the system may easily shift display languages (multilingual mode) by operator selection. Step 80 logs in the diamond search event as c-1a into retailer computer 10. Step 82 compiles a diamond list or a list of diamonds from diamond database 26 which match the common characteristics input by the consumer as search criteria. FIG. 9B shows a typical output or display screen showing the results of a particular search. Further, the display screen in FIGS. 9A, 9B, 9C may include a "see salesperson now" active area (selected by touch screen or selected by mouse or keypad) which electronically requests that the retailer at retailer computer 10 send over a salesperson to personally interact with the consumer at consumer computer 1. This step manually activates the C alarm. Step 84 logs in the scope of the diamond or D search event as data entry c-1b. The scope of the search may be important because, if the consumer has identified, for example, a diamond more than 3 carats in size or has entered more than three search inquiries, the alarm trigger or monitor may be activated and a salesperson may be called over to the consumer at consumer computer 1. This search count is a frequency trigger alarm. The 3 carat trigger is a search scope alarm. By personally interacting in a face to face transaction with the consumer at consumer computer 1, the retailer has a higher probability of closing or making a sale of a diamond or piece of jewelry. Step 86 determines whether the consumer at consumer computer 1 has initiated a new search. If YES, step 87 increments the log event c-1c which again tracks the search by the consumer at consumer computer 1. If the NO branch is taken from step 86, the system executes step 88 which selects or permits the selection by the consumer of a specific diamond D and displays that diamond record in detail. FIG. 9C shows a consumer detail view of a particular diamond. It should be noted that the retail price of the diamond as well as other common characteristics are shown. The wholesale price of the diamond is not shown to the consumer. However, in the system illustrated in FIG. 2, wherein the retailers computer 10 shows a number of consumer computers in a split screen format, the retailer knows when the consumer has selected a particular diamond to be viewed, and also knows what the wholesale price of that diamond is and knows what the profit factor is for the stone. When the profit factor exceeds a certain level, the retailer computer 10 may issue an alarm (audio, visual, electronic or otherwise) (a search scope trigger) which prompts the retailer at retailer computer 10 to send over a salesperson to the consumer at consumer computer 1. This assists in closing or finalizing the sale of a diamond to the consumer in a face to face transaction. Step 90 logs in the diamond search "select stone" event as c-1$d$. Decision step 92 determines whether the consumer has selected a new search. If YES, the system repeats and goes to increment log step 87 and then to enter diamond search criteria step 78. If NO, the computer program module ends.

Figure 10:
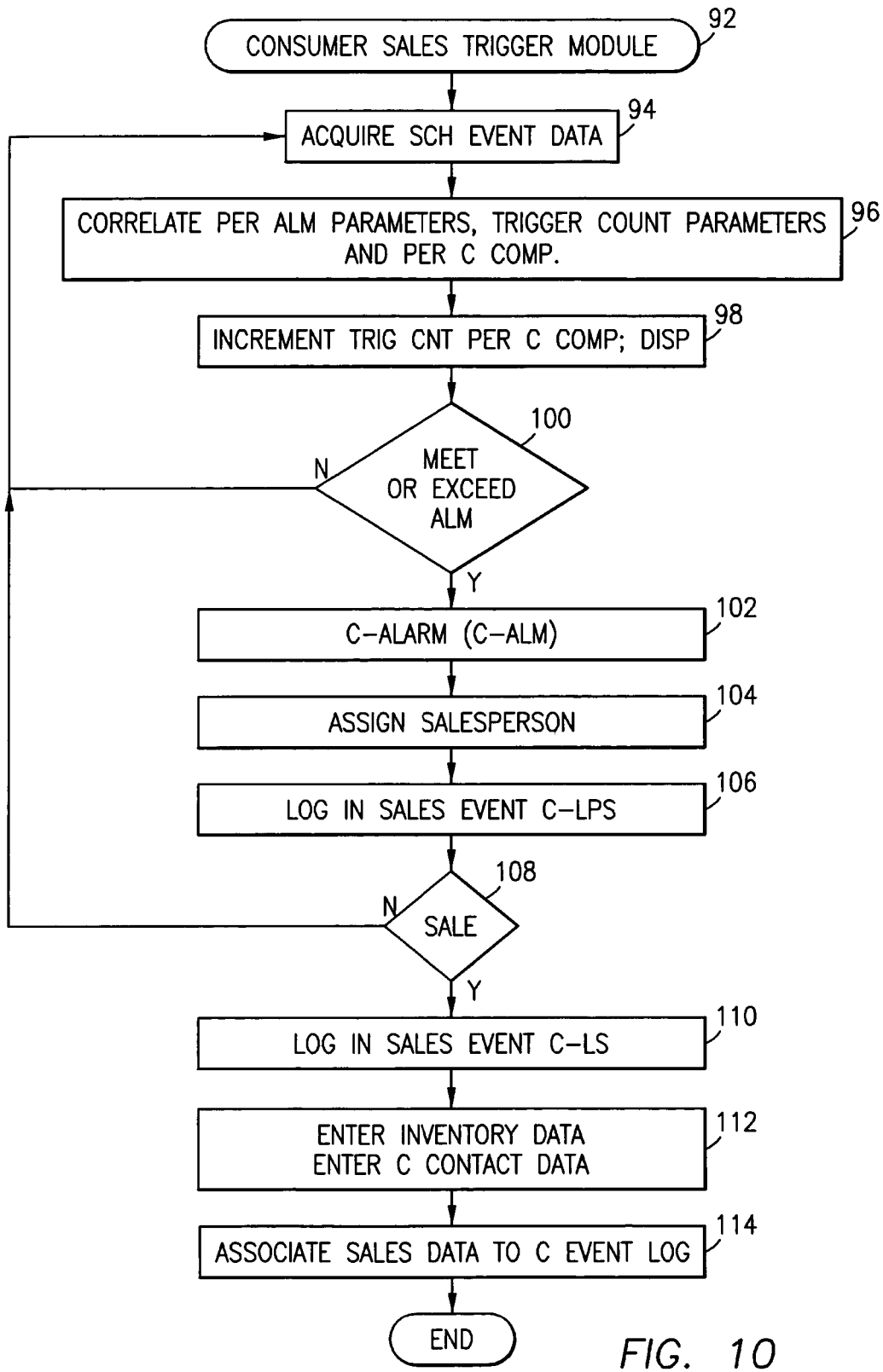
FIG. 10 diagrammatically illustrates the consumer sales trigger module.

FIG. 10 shows consumer sales trigger module 92. In this module, retailer computer 10 acquires search event data in step 94. This search event data is discussed above in connection with FIG. 8. Other search event data can be acquired such as the amount of time the consumer is at consumer computer 1 (time based alarm), the frequency of the searches by the consumer at the computer (frequency alarm), the detail level of the diamond selected (stone alarm, color alarm, price alarm etc.). In other words, when the consumer has selected two or three diamonds within a price range $1,000-$1,500 (bounded price alarm), this electronic event may set off an alarm to the retailer. Step 96 correlates the alarm parameters and the trigger count parameters on each consumer computer. For example, the consumer conducts a diamond search, a smaller and shorter trigger count is displayed for a time based alarm. A four count frequency alarm displays the trigger count in quartiles for each successive D search for a single consumer. After four searches, an alarm is issued. Another characteristic to monitor and track the consumer searches through the diamond database is the frequency with which the consumer searches, or a dollar amount or a carat weight amount. Other alarm parameters can be either pre-set or selected by the retailer during the set-up. Step 98 increments the trigger count on each consumer computer (an algorithm linked to selected trigger events) and that incrementing trigger count is displayed on retailer computer 10. In other words, the closer the consumer on each consumer computer comes to setting off the trigger or sales alarm, the higher the displayed increment or trigger count on the retailer computer 10. This display is helpful if a salesperson at the retail establishment is free and the consumer is 60-80% towards sounding a consumer-retailer alarm on the retailer's system. The manager at retailer computer 10 can send over the salesperson who is not busy to the consumer on the computer. Decision step 100 determines whether the search event data from each consumer computer meets or exceeds the alarm threshold. If not, the NO branch is taken to the acquire search event data step 94. If YES, the system executes step 102 which issues a consumer alarm or c-alm. This consumer alarm may be audio, visual, electronic or otherwise and stimulates or prompts the manager at retailer computer 10 to send over a salesperson to the consumer at one of the consumer computers 1, 2, 3. An electronic alarm may be a pager. A blinking light is a visual alarm. Step 104 enables the manager at retailer computer 10 to electronically assign a salesperson to a particular consumer at one of the consumer computers. The salespeople may be listed in a drop down list on computer 10. Step 106 logs in the sales event and associates' name with the sales event c-1$ps$ (prospective sale) and the search event data compiled in realtime from the consumer computer 1, 2, 3. Decision step 108 determines whether a sale has been made. If not, the system returns to step "acquire" search event data 94. If YES, the system in step 110 logs in the sales event as c-1$s$ (sale). This data entry therefore ties in and correlates the consumer's searches through the consumer computers 1, 2, 3, the salesperson assigned to that consumer, the consumer contact data input by the consumer before he or she began the search and also the type and quality of sale. Of course, the wholesale cost of the goods sold and the retail cost and the percent mark-up can also be assigned, as well as the commission to be paid the salesperson, if appropriate. Step 112 sends signals and updates the inventory data in diamond database 26 and also assigns the consumer or C contact data to that sale. Step 114 associates the sales data to the consumer or C event log. In this manner, it can be easily envisioned that the warehouse computer 21 (FIG. 3) could generate and monitor in realtime consumers in various store locations 12a, 12b and 12c wherein consumers are accessing and searching the diamond database 26 then located remote from the retail facility 12a, 12b, 12c, preferably at wholesale location 21. Otherwise, computer 21 could be an application service provider ASP system under the control of a wholesaler but owned by a trusted third party. Further, the wholesaler can run display ads at simultaneous display 24 (FIG. 2) providing a timed sale of diamonds, stones and jewelry and monitor in realtime the consumer's reaction on consumer computer terminals 1, 2, 3 and also tie in the sales of those stones and jewelry via retailer computer 10. When the sale ends after a set period of time, for example 1-2 hours, a correlation between the quality of the ad, the effectiveness of the ad, the discount price offered for the goods, and the reaction of consumers at consumer computers 1, 2, 3 is helpful in designing future advertisements, marketing and promotional activities.

Figure 11:
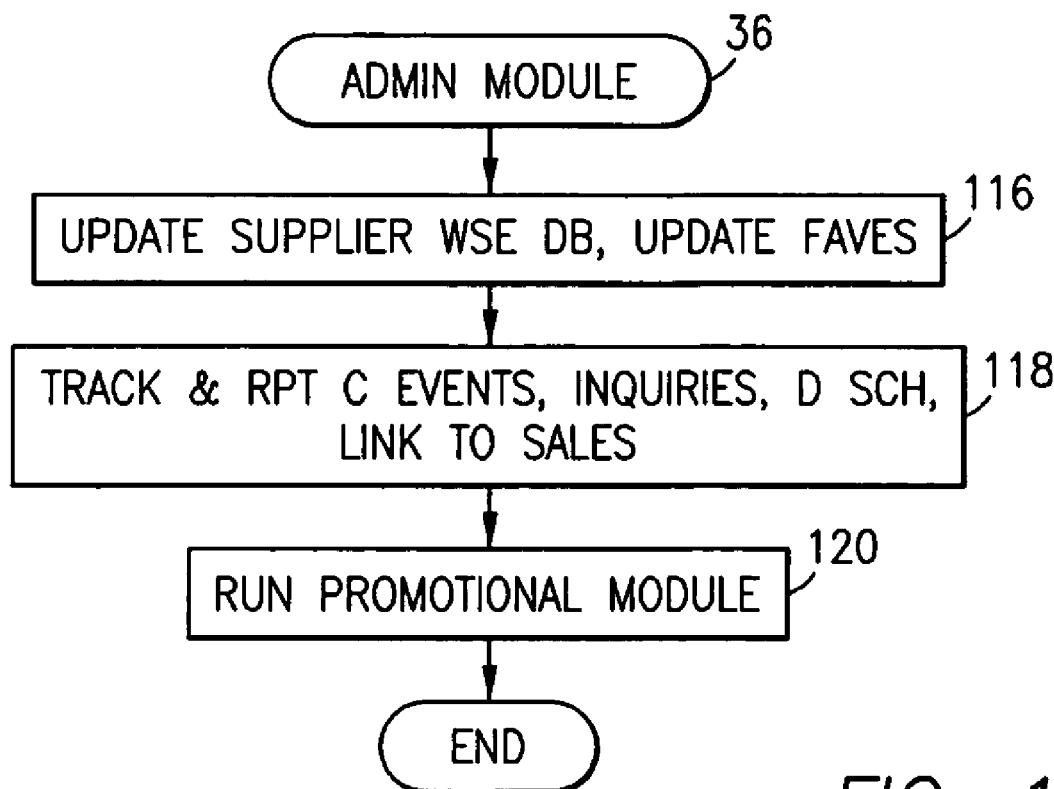
FIG. 11 diagrammatically illustrates the administration module.

FIG. 11 diagrammatically illustrates administration mode 36. In step 116, the retailer on retailer computer 10 updates the supplier or wholesaler database 28 and updates his or her favorite wholesalers as shown earlier in connection with the retailer display screens. Step 118 tracks and reports the consumer events recorded from consumer computers 1, 2, 3, the inquiries made by the consumers, the specific diamond data retrieved by the consumers, and links those searches and consumer events to particular sales. In this manner, the effectiveness of the electronic sales system can be statistically measured. Step 120 runs a promotional module discussed later.

Figure 12:
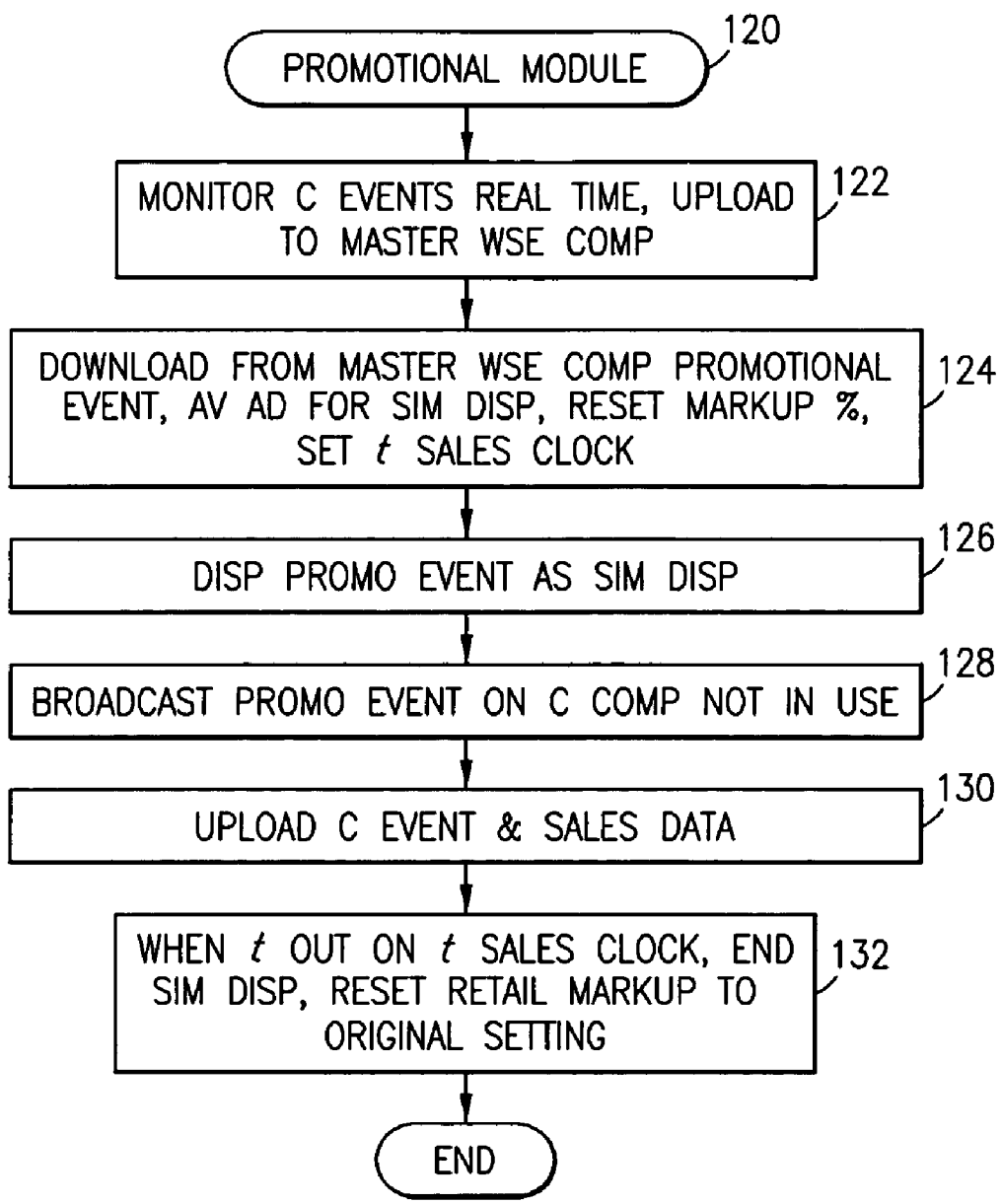
FIG. 12 diagrammatically illustrates the promotional module.

Promotional module 120 is diagrammatically shown in FIG. 12. Step 122 monitors the consumer C events in realtime, and uploads this information to the master wholesale computer or, in a franchise situation, to the franchisor. In a franchise situation, the franchisor maintains wholesaler computer 21 (FIG. 3) and franchisees in stores St1, St2 and St3 are under the control or some type of supervision from the franchiser operating wholesale computer 21. In this sense, the term "wholesaler" refers to any company or entity supplying diamonds or jewels to other merchants downstream in the commercial chain whether licensor, franchisor or independent third party. In step 124, the master wholesaler downloads from computer 21 a promotional event. Audio-visual ads are downloaded and displayed on the simultaneous display 24 (FIG. 2). The master wholesaler 21 may reset the retail markup percentage and may set the time for the sales clock. In other words, the sale displayed on simultaneous display 24 may be timed for a certain or fixed time period. In step 126, the system displays the promotional event on the simultaneous display 24. In step 128, the promotional event is broadcast on the consumer computers that are not in use. In other words, the simultaneous display 24 can be operated in conjunction with unused consumer computers 1, 2, 3, and the same ad can be run on all the computers. Display 24 may be outside the retailer's store or premises. When a customer or consumer approaches one of the consumer computers 1, 2, 3, and touches the screen or the keyboard, the initial sign-on screen appears for the consumers' prompting, in one embodiment, of the input of his or her user name. This consumer interaction stops the ad. In step 130, the consumer events and sales data are uploaded to the master wholesale computer 21. In step 132, the sales time for the sales clock runs out and the ad is terminated and/or the sales event is terminated on the simultaneous display 24. The wholesale computer 21 then resets the retail mark-up in retail computer 10 to the original setting.

Although most of the foregoing discussion involves the sale of diamonds, the present system can be configured to sell and track the promotion and sale of jewels. The jewelry can be categorized in a jewelry database 29 and some common characteristics of jewelry are found below.

| Jewelry Common Characteristics |
|---|
| gold - silver |
| rings |
| subset wedding rings |
| subset mens rings |
| subset ladies rings |
| subset diamond |
| subset precious gems |
| subset semi-precious gems |
| subset fancy rings |
| bracelets |
| ankle bracelets |
| bangle bracelets |
| etc. |

The same theories can be implemented to permit the consumer to "browse" the wholesaler's data in database 26, 29 and promote the sale of diamonds, stones, and jewelry.

The claims appended hereto are meant to cover modifications and changes within the scope and spirit of the present invention.

What is claimed is:

1. A method for electronically vertically integrating a consumer interested in buying a diamond, a retailer of said diamond and a wholesaler selling a plurality of diamonds comprising:

maintaining a diamond inventory data base compilation of said plurality of diamonds, said data base listing each diamond of said plurality of diamonds at least by common characteristics and by wholesale price and by retail price;

in a retail facility under the control of said retailer:
   electronically searching by said consumer to said inventory data base with search criteria relative to said common characteristics and said retail price and displaying, to said consumer, for any diamond within the scope of said search, said common characteristics and said retail price;

displaying, to said retailer, for any diamond found by said consumer within the scope of said search, and said common characteristics and said retail price and said wholesale price of said diamond found by said consumer, and facilitating a face to face sale of any diamond between said consumer and said retailer; and, tracking said consumer searches and, based upon predetermined parameters, issuing an alarm to said retailer to initiate said face to face sale.

2. A method for electronically integrating as claimed in claim 1 wherein the step of displaying to said retailer said wholesale price does not include displaying said wholesale price to said consumer.

3. A method for electronically integrating as claimed in claim 2 including maintaining said diamond inventory data base either at said retail facility or at a remote facility under the control of said wholesaler.

4. A method for electronically integrating as claimed in claim 3 wherein said retail facility under the control of said retailer is a retail establishment owned or controlled by said retailer.

5. A method for electronically integrating as claimed in claim 4 wherein said common characteristics include color, weight in carats, cut and clarity.

6. A method for electronically integrating as claimed in claim 5 wherein the step of maintaining includes maintaining a certification certificate for at least some of said plurality of diamonds in said diamond inventory data base and the step of displaying to consumer includes displaying the certificate associated said diamond found by said consumer within the scope of said search if such certificate is associated therewith.

7. A method for electronically integrating as claimed in claim 6 wherein the step of maintaining includes an electronic transfer of data relative to said diamond data base between said retailer and said wholesaler.

8. A method for electronically integrating as claimed in claim 7 including a plurality of consumers and including the step of permitting a plurality of consumer searches and a plurality of consumer displays.

9. A method for electronically integrating as claimed in claim 8 including maintaining said diamond data base with data representing diamonds from a plurality of wholesalers.

10. A method for electronically integrating as claimed in claim 9 wherein the step of permitting said consumer search includes using an interactive touch screen display.

11. A method for electronically integrating as claimed in claim 10 including multilingual electronic interactions with said consumer.

12. A method for electronically integrating as claimed in claim 11 including displaying educational data relative to the purchase of diamonds to said consumer.

13. A method for electronically integrating as claimed in claim 12 wherein said alarm is an alarm from the group consisting of an audio alarm, a visual alarm, a combination audio-visual alarm and an electronic alarm.

14. A method for electronically integrating as claimed in claim 13 wherein the step of facilitating said face to face sale includes the step of selling said diamond found by said consumer.

15. A method for electronically integrating as claimed in claim 1 including maintaining said diamond inventory data base at said retail facility.

16. A method for electronically integrating as claimed in claim 1 including maintaining said diamond inventory data base at a remote facility.

17. A method for electronically integrating as claimed in claim 16 wherein said diamond inventory data base is maintained at a facility under the control of said wholesaler.

18. A method for electronically integrating as claimed in claim 1 wherein said retail facility under the control of said retailer is a retail establishment owned or controlled by said retailer.

19. A method for electronically integrating as claimed in claim 1 wherein said common characteristics include color, weight in carats, cut and clarity.

20. A method for electronically integrating as claimed in claim 1 wherein the step of maintaining includes maintaining a certification certificate for at least some of said plurality of diamonds in said diamond inventory data base and the step of displaying to consumer includes displaying the certificate associated said diamond found by said consumer within the scope of said search if such certificate is associated therewith.

21. A method for electronically integrating as claimed in claim 1 wherein the step of maintaining includes an electronic transfer of data relative to said diamond data base between said retailer and said wholesaler.

22. A method for electronically integrating as claimed in claim 1 including a plurality of consumers and including the step of permitting a plurality of consumer searches and a plurality of consumer displays.

23. A method for electronically integrating as claimed in claim 1 including maintaining said diamond data base with data representing diamonds from a plurality of wholesalers.

24. A method for electronically integrating as claimed in claim 1 wherein the step of permitting said consumer search includes using an interactive touch screen display.

25. A method for electronically integrating as claimed in claim 1 including multilingual electronic interactions with said consumer.

26. A method for electronically integrating as claimed in claim 1 including displaying educational data relative to the purchase of diamonds to said consumer.

27. A method for electronically integrating as claimed in claim 1 wherein said alarm is an alarm from the group consisting of an audio alarm, a visual alarm, a combination audio-visual alarm and an electronic alarm.

28. A method for electronically integrating as claimed in claim 1 wherein the step of facilitating said face to face sale includes the step of selling said diamond found by said consumer.

29. An electronic sales methodology, to facilitate a face to face sale of a diamond between a consumer and a retailer in a retail facility under the control of said retailer, and for electronically vertically integrating said consumer, said retailer and a wholesaler selling a plurality of diamonds comprising:
  maintaining an electronic compilation of said plurality of diamonds which lists each diamond by common characteristics and by wholesale price and by retail price;
  at said retail facility, electronically searching by said consumer said electronic compilation of diamonds;
  displaying to said consumer at said facility, common characteristics and retail price of one or more diamonds within the scope of said search;
  displaying, to said retailer at said facility, said common characteristics and said retail price and said wholesale price of said one or more diamonds displayed by said consumer to facilitate said face to face sale; and,
  tracking said consumer searches and, based upon predetermined parameters, issuing an alarm to said retailer to initiate said face to face sale.

30. An electronic sales method as claimed in claim 29 wherein the step of displaying to said retailer said wholesale price does not include displaying said wholesale price to said consumer.

31. An electronic sales method as claimed in claim 30 including maintaining said electronic compilation of diamonds either at said retail facility, at a remote facility under the control of a third party or at a remote facility under the control of said wholesaler.

32. An electronic sales method as claimed in claim 31 wherein said common characteristics include color, weight in carats, cut and clarity.

33. An electronic sales method as claimed in claim 32 wherein the step of maintaining includes maintaining a certification certificate for at least some of said plurality of diamonds in said diamond inventory data base and the step of displaying to consumer includes displaying the certificate associated said diamond found by said consumer within the scope of said search if such certificate is associated therewith.

34. An electronic sales method as claimed in claim 33 wherein the step of maintaining includes an electronic transfer of data relative to said electronic compilation of diamonds between said retailer and said wholesaler.

35. An electronic sales method as claimed in claim 34 including a plurality of consumers and including the step of permitting a plurality of consumer searches and a plurality of consumer displays.

36. An electronic sales method as claimed in claim 35 including maintaining said electronic compilation of diamonds with data representing diamonds from a plurality of wholesalers.

37. An electronic sales method as claimed in claim 36 wherein the step of permitting said consumer search includes using an interactive touch screen display.

38. An electronic sales method as claimed in claim 37 including multilingual electronic interactions with said consumer.

39. An electronic sales method as claimed in claim 38 including displaying educational data relative to the purchase of diamonds to said consumer.

40. An electronic sales method as claimed in claim 39 wherein said alarm is an alarm from the group consisting of an audio alarm, a visual alarm, a combination audio-visual alarm and an electronic alarm.

41. An electronic sales method as claimed in claim 29 including maintaining said electronic compilation of diamonds either at said retail facility, at a remote facility under the control of a third party or at a remote facility under the control of said wholesaler.

42. An electronic sales method as claimed in claim 29 wherein said common characteristics include color, weight in carats, cut and clarity.

43. An electronic sales method as claimed in claim 29 wherein the step of maintaining includes maintaining a certification certificate for at least some of said plurality of diamonds and the step of displaying to consumer includes displaying the certificate associated said diamond found by said consumer within the scope of said search if such certificate is associated therewith.

44. An electronic sales method as claimed in claim 29 wherein the step of maintaining includes an electronic transfer of data relative to said diamond data base between said retailer and said wholesaler.

45. An electronic sales method as claimed in claim 29 including a plurality of consumers and including the step of permitting a plurality of consumer searches and a plurality of consumer displays.

46. An electronic sales method as claimed in claim 29 including maintaining said electronic compilation of diamonds with data representing diamonds from a plurality of wholesalers.

47. An electronic sales method as claimed in claim 29 wherein the step of permitting said consumer search includes using an interactive touch screen display.

48. An electronic sales method as claimed in claim 29 including multilingual electronic interactions with said consumer.

49. An electronic sales method as claimed in claim 29 including displaying educational data relative to the purchase of diamonds to said consumer.

50. An electronic sales method as claimed in claim 29 wherein said alarm is an alarm from the group consisting of an audio alarm, a visual alarm, a combination audio-visual alarm and an electronic alarm.

51. A computer readable medium containing programming instructions for an electronic sales methodology, to facilitate a face to face sale of a diamond between a consumer and a retailer in a retail facility under the control of said retailer, and for electronically vertically integrating said consumer, said retailer and a wholesaler selling a plurality of diamonds, the programming instructions comprising:
maintaining an electronic compilation of said plurality of diamonds which lists each diamond by common characteristics and by wholesale price and by retail price;
at said retail facility, permitting said consumer to search said electronic compilation of diamonds;
displaying to said consumer at said facility, common characteristics and retail price of one or more diamonds within the scope of said search;
displaying, to said retailer at said facility, said common characteristics and said retail price and said wholesale price of said one or more diamonds displayed by said consumer to facilitate said face to face sale; and,
tracking said consumer searches and, based upon predetermined parameters, issuing an alarm to said retailer to initiate said face to face sale.

52. A computer readable medium containing programming instructions as claimed in claim 51 wherein the program for displaying to said retailer said wholesale price does not include displaying said wholesale price to said consumer.

53. A computer readable medium containing programming instructions as claimed in claim 52 wherein said electronic compilation is a diamond inventory data base and the program includes maintaining said diamond inventory data base either at said retail facility, at a remote facility under the control of a third party or at a remote facility under the control of said wholesaler.

54. A computer readable medium containing programming instructions as claimed in claim 53 wherein said common characteristics include color, weight in carats, cut and clarity.

55. A computer readable medium containing programming instructions as claimed in claim 54 wherein the program maintains a certification certificate for at least some of said plurality of diamonds in said diamond inventory data base and the instruction of displaying to consumer includes displaying the certificate associated said diamond found by said consumer within the scope of said search if such certificate is associated therewith.

56. A computer readable medium containing programming instructions as claimed in claim 55 wherein the program includes an electronic transfer of data relative to said diamond data base between said retailer and said wholesaler.

57. A computer readable medium containing programming instructions as claimed in claim 56 including permitting a plurality of consumer searches and a plurality of consumer displays.

58. A computer readable medium containing programming instructions as claimed in claim 57 including maintaining said diamond data base with data representing diamonds from a plurality of wholesalers.

59. A computer readable medium containing programming instructions as claimed in claim 58 wherein the program permits said consumer search with an interactive touch screen display.

60. A computer readable medium containing programming instructions as claimed in claim 59 including multilingual electronic interactions with said consumer.

61. A computer readable medium containing programming instructions as claimed in claim 60 including displaying educational data relative to the purchase of diamonds to said consumer.

62. A computer readable medium containing programming instructions as claimed in claim 61 wherein said alarm is an alarm from the group consisting of an audio alarm, a visual alarm, a combination audio-visual alarm and an electronic alarm.

63. A computer readable medium containing programming instructions as claimed in claim 51 wherein said electronic compilation is a diamond inventory data base and including maintaining said diamond inventory data base either at said retail facility, at a remote facility under the control of a third party or at a remote facility under the control of said wholesaler.

64. A computer readable medium containing programming instructions as claimed in claim 51 wherein said common characteristics include color, weight in carats, cut and clarity.

65. A computer readable medium containing programming instructions as claimed in claim 51 wherein said electronic compilation is a diamond inventory data base which includes data representing a certification certificate for at least some of said plurality of diamonds in said diamond inventory data base and the instruction of displaying to consumer includes displaying the certificate associated said diamond found by said consumer within the scope of said search if such certificate is associated therewith.

66. A computer readable medium containing programming instructions as claimed in claim 51 wherein the electronic compilation is a diamond data base and the program includes an electronic transfer of data relative to said diamond data base between said retailer and said wholesaler.

67. A computer readable medium containing programming instructions as claimed in claim 51 including permitting a plurality of consumer searches and a plurality of consumer displays.

68. A computer readable medium containing programming instructions as claimed in claim 51 wherein said electronic compilation is a diamond data base and the program includes maintaining said diamond data base with data representing diamonds from a plurality of wholesalers.

69. A computer readable medium containing programming instructions as claimed in claim 51 wherein the program permits said consumer search with an interactive touch screen display.

70. A computer readable medium containing programming instructions as claimed in claim 51 including multilingual electronic interactions with said consumer.

71. A computer readable medium containing programming instructions as claimed in claim 51 including displaying educational data relative to the purchase of diamonds to said consumer.

72. A computer readable medium containing programming instructions as claimed in claim 51 wherein said alarm is an alarm from the group consisting of an audio alarm, a visual alarm, a combination audio-visual alarm and an electronic alarm.

73. A method for electronically vertically integrating a consumer interested in buying a piece of jewelry, a retailer selling a plurality of pieces of jewelry and a wholesaler selling a further plurality of pieces of jewelry comprising:
maintaining a jewelry inventory data base compilation representing said plurality of pieces of jewelry, said data base listing each piece of jewelry by common characteristics and by wholesale price and by retail price;
in a retail facility under the control of said retailer:
electronically searching by said consumer said inventory data base with search criteria relative to said common characteristics and said retail price and displaying, to said consumer, for any piece of jewelry within the scope of said search, said common characteristics and said retail price;
displaying, to said retailer, for any piece of jewelry found by said consumer within the scope of said search, and said common characteristics and said retail price and said wholesale price of said piece of jewelry found by said consumer, and facilitating a face to face sale of any piece of jewelry between said consumer and said retailer; and,
tracking said consumer searches and, based upon predetermined parameters, issuing an alarm to said retailer to initiate said face to face sale.

74. A method for electronically integrating as claimed in claim 73 wherein the step of displaying to said retailer said wholesale price does not include displaying said wholesale price to said consumer.

75. A method for electronically integrating as claimed in claim 74 including maintaining said inventory data base either at said retail facility or at a remote facility under the control of said wholesaler.

76. A method for electronically integrating as claimed in claim 75 wherein said retail facility under the control of said retailer is a retail establishment owned or controlled by said retailer.

77. A method for electronically integrating as claimed in claim 76 wherein said common characteristics include type of precious metal, type of jewel, and type of jewelry.

78. A method for electronically integrating as claimed in claim 77 wherein the step of maintaining includes maintaining a certification certificate for at least some of pieces of jewelry having one or more diamonds therein in said inventory data base and the step of displaying to consumer includes displaying the certificate associated said piece of jewelry found by said consumer within the scope of said search if such certificate is associated therewith.

79. A method for electronically integrating as claimed in claim 78 wherein the step of maintaining includes an electronic transfer of data relative to said data base between said retailer and said wholesaler.

80. A method for electronically integrating as claimed in claim 79 including a plurality of consumers and including the step of permitting a plurality of consumer searches and a plurality of consumer displays.

81. A method for electronically integrating as claimed in claim 80 including maintaining said data base with data representing piece of jewelry from a plurality of wholesalers.

82. A method for electronically integrating as claimed in claim 81 wherein the step of permitting said consumer search includes using an interactive touch screen display.

83. A method for electronically integrating as claimed in claim 82 including multilingual electronic interactions with said consumer.

84. A method for electronically integrating as claimed in claim 83 including displaying educational data relative to the purchase of jewelry to said consumer.

85. A method for electronically integrating as claimed in claim 84 wherein said alarm is an alarm from the group consisting of an audio alarm, a visual alarm, a combination audio-visual alarm and an electronic alarm.

86. A method for electronically integrating as claimed in claim 85 wherein the step of facilitating said face to face sale includes the step of selling said piece of jewelry found by said consumer.

87. A method for electronically integrating as claimed in claim 73 including maintaining said inventory data base at said retail facility.

88. A method for electronically integrating as claimed in claim 73 including maintaining said inventory data base at a remote facility.

89. A method for electronically integrating as claimed in claim 88 wherein said inventory data base is maintained at a facility under the control of said wholesaler.

90. A method for electronically integrating as claimed in claim 73 wherein said retail facility under the control of said retailer is a retail establishment owned or controlled by said retailer.

91. A method for electronically integrating as claimed in claim 73 wherein said common characteristics include type of precious metal, type of jewel, and type of jewelry.

92. A method for electronically integrating as claimed in claim 73 wherein the step of maintaining includes maintaining a certification certificate for at least some of pieces of jewelry having one or more diamonds therein in said inventory data base and the step of displaying to consumer includes displaying the certificate associated said piece of jewelry found by said consumer within the scope of said search if such certificate is associated therewith.

93. A method for electronically integrating as claimed in claim 73 wherein the step of maintaining includes an electronic transfer of data relative to said data base between said retailer and said wholesaler.

94. A method for electronically integrating as claimed in claim 73 including a plurality of consumers and including the step of permitting a plurality of consumer searches and a plurality of consumer displays.

95. A method for electronically integrating as claimed in claim 73 including maintaining said data base with data representing jewelry from a plurality of wholesalers.

96. A method for electronically integrating as claimed in claim 73 wherein the step of permitting said consumer search includes using an interactive touch screen display.

97. A method for electronically integrating as claimed in claim 73 including multilingual electronic interactions with said consumer.

98. A method for electronically integrating as claimed in claim 73 including displaying educational data relative to the purchase of jewelry to said consumer.

99. A method for electronically integrating as claimed in claim 73 wherein said alarm is an alarm from the group consisting of an audio alarm, a visual alarm, a combination audio-visual alarm and an electronic alarm.

100. A method for electronically integrating as claimed in claim 73 wherein the step of facilitating said face to face sale includes the step of selling said piece of jewelry found by said consumer.

* * * * *